United States Patent
Leta et al.

(10) Patent No.: US 8,673,132 B2
(45) Date of Patent: Mar. 18, 2014

(54) HEAVY OIL CONVERSION PROCESS WITH IN-SITU POTASSIUM SULFIDE GENERATION

(75) Inventors: Daniel P. Leta, Flemington, NJ (US); Jonathan M. McConnachie, Annandale, NJ (US); William C. Baird, Jr., Baton Rouge, LA (US); Walter D. Vann, Nazareth, PA (US); Jorge L. Soto, Centreville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 160 days.

(21) Appl. No.: 13/432,505

(22) Filed: Mar. 28, 2012

(65) Prior Publication Data

US 2012/0234728 A1 Sep. 20, 2012

Related U.S. Application Data

(63) Continuation-in-part of application No. 12/967,703, filed on Dec. 14, 2010, now Pat. No. 8,404,106.

(60) Provisional application No. 61/284,517, filed on Dec. 18, 2009.

(51) Int. Cl.
*C10G 19/08* (2006.01)
*C10G 19/00* (2006.01)
*C10G 45/02* (2006.01)

(52) U.S. Cl.
USPC .......... 208/235; 208/208 R; 208/209; 208/49; 208/226; 208/230

(58) Field of Classification Search
USPC .......... 208/46, 49, 208 R, 209, 226, 230, 235
See application file for complete search history.

(56) References Cited

U.S. PATENT DOCUMENTS 4,119,528 A * 10/1978 Baird, Jr. et al. .............. 208/108
4,437,980 A * 3/1984 Heredy et al. ................. 208/235

OTHER PUBLICATIONS

Antos, George J. et al., "Catalytic Naphtha Reforming—Second Edition, Revised and Expanded", 2004, pp. 11, 105-140, Marcel Dekker, Inc., New York, USA.

* cited by examiner

*Primary Examiner* — Walter D Griffin
*Assistant Examiner* — Derek Mueller
(74) *Attorney, Agent, or Firm* — Bruce M. Bordelon; Chad A. Guice (57) ABSTRACT

The present invention relates to a process for regeneration of alkali metal salt reagent used in desulfurization of heavy oil feedstreams. In particular, the present invention relates to a process utilizing potassium hydroxide as an external supply reagent to a heavy oil conversion process and in-situ conversion of the spent reactants utilized in such process into a potassium sulfide reagent for reintroduction into the heavy oil conversion process.

21 Claims, 5 Drawing Sheets

HEAVY OIL CONVERSION PROCESS WITH IN-SITU POTASSIUM SULFIDE GENERATION

CROSS REFERENCE TO RELATED APPLICATIONS

This application is a Continuation-In-Part which claims priority to U.S. Non-Provisional Application Ser. No. 12/967,703 filed Dec. 14, 2010, now U.S. Pat. No. 8,404,106, which claims application Ser. No. 12/967,703 filed Dec. 14, 2010, which claims priority to U.S. Provisional Application Ser. No. 61/284,517 filed Dec. 18, 2009, to which are herein incorporated by reference in their entirety.

FIELD OF THE INVENTION

The present invention relates to a process for regeneration of alkali metal salt reagent used in desulfurization of heavy oil feedstreams. In particular, the present invention relates to a process utilizing potassium hydroxide as an external supply reagent to a heavy oil conversion process and in-situ conversion of the spent reactants utilized in such process into a potassium sulfide reagent for reintroduction into the heavy oil conversion process.

DESCRIPTION OF RELATED ART

Heavy oils and bitumens make up an increasing percentage of available liquid hydrocarbon resources. As the demand for hydrocarbon-based fuels has increased, a corresponding need has developed for improved processes for desulfurizing heavy oil feedstreams. Processes for the conversion of the heavy portions of these feedstreams into more valuable, lighter fuel products have also taken on greater importance. These heavy oil feedstreams include, but are not limited to, whole and reduced petroleum crudes, shale oils, coal liquids, atmospheric and vacuum residua, asphaltenes, deasphalted oils, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, raffinates, and mixtures thereof.

Hydrocarbon streams boiling above 430° F. (220° C.) often contain a considerable amount of large multi-ring hydrocarbon molecules and/or a conglomerated association of large molecules containing a large portion of the sulfur, nitrogen and metals present in the hydrocarbon stream. A significant portion of the sulfur contained in these heavy oils is in the form of heteroatoms in polycyclic aromatic molecules, comprised of sulfur compounds such as dibenzothiophenes, from to which the sulfur is difficult to remove.

Processing of bitumens, crude oils, or other heavy oils with large numbers of multi-ring aromatics and/or asphaltenes can pose a variety of challenges. Conventional hydroprocessing methods can be effective at improving API for a heavy oil feed, but the hydrogen consumption can be substantial. Conversion of the liquid to less valuable products, such as coke, can be another concern with conventional techniques.

Heavy oil upgrading (desulfurization) processes can utilize an alkali metal hydroxide such as potassium hydroxide (KOH) or sodium hydroxide (NaOH) as a reagent in the heavy oil conversion process, then separate and regenerate the spent reagent back into an alkali metal hydroxide (e.g., KOH or NaOH) for recycling back into the heavy oil upgrading process. What is needed in the industry is an improved spent alkali metal reagent regeneration process that results in improved heavy oil conversion capacity and associated reaction product benefits in the associated heavy oil upgrading processes.

SUMMARY OF THE INVENTION

The present invention relates to a process for regeneration of alkali metal salt reagent used in desulfurization of heavy oil feedstreams. In particular, the present invention relates to a process utilizing potassium hydroxide as an external supply reagent to a heavy oil conversion process and in-situ conversion of the spent reactants utilized in such process into a potassium sulfide reagent for reintroduction into the heavy oil conversion process.

A preferred embodiment herein is a process for desulfurizing a heavy oil feedstream with a potassium sulfide reagent and regenerating the potassium sulfide reagent from spent potassium salt reaction products, comprising:

a) mixing at least a portion of a heavy oil feedstream having an API gravity of about 19 or less with a desulfurization reagent solution comprising potassium sulfide to form a mixed oil/reagent feedstream;

b) exposing at least a portion of the mixed oil/reagent feedstream to effective desulfurization conditions in a conversion reactor to form a desulfurized reactor outlet stream, thereby removing at least a portion of the sulfur from the heavy oil feedstream components of the mixed oil/reagent stream and converting at least a portion of the potassium sulfide in the mixed reagent stream to spent potassium salts comprising potassium hydrosulfide;

c) adding a wash water to the desulfurized reactor outlet stream to form a desulfurized oil/water mixture;

d) separating the desulfurized oil/water mixture into a separate oil phase and a separate water phase in at least one wash water vessel, wherein the water phase contains the majority of the spent potassium salts;

e) extracting at least a portion of the separate oil phase from the wash water vessel as a desulfurized heavy oil product, and extracting at least a portion of the separate water phase from the wash water vessel as an aqueous spent potassium reagent stream;

f) splitting the aqueous spent potassium reagent stream into a non regenerative potassium hydrosulfide stream and a regenerative potassium hydrosulfide stream;

g) sending the regenerative potassium hydrosulfide stream to a KOH conversion process, converting the majority of the potassium hydrosulfide to potassium hydroxide in the KOH conversion process, and producing an aqueous regenerated KOH stream from the KOH conversion process;

h) combining at least a portion of the aqueous regenerated KOH stream with at least a portion of the non-regenerative potassium hydrosulfide stream to produce a partially regenerated potassium reagent stream containing potassium hydroxide and potassium hydrosulfide;

i) sending the partially regenerated potassium reagent stream to a flash regeneration system wherein the partially regenerated potassium reagent stream is subject to a dehydration temperature of at least about 250° C. (482° F.), thereby converting at least a portion of the potassium hydroxide and potassium hydrosulfide in the partially regenerated potassium reagent stream to potassium sulfide;

j) extracting a regenerated potassium sulfide reagent stream from the flash regeneration system;

k) utilizing at least a portion of the regenerated potassium sulfide reagent stream in the desulfurization reagent solution of step a).

In a preferred embodiment, the aqueous spent potassium reagent stream contains at least 50 wt % of all of the spent potassium salts generated in step h).

In another preferred embodiment, the non-regenerative potassium hydrosulfide stream and the regenerative potassium hydrosulfide stream are split in step f) such that the KHS molar content in non-regenerative potassium hydrosulfide stream:KHS molar content in the regenerative potassium hydrosulfide stream is from about 0.7:1 to about 1:0.7.

In yet another preferred embodiment, the non-regenerative potassium hydrosulfide stream and the regenerative potassium hydrosulfide stream are split in step f) such that the KHS molar content in non-regenerative potassium hydrosulfide stream:molar content of the aqueous regenerated KOH stream is from about 0.8:1 to about 1:0.8.

In yet another preferred embodiment, the KOH to KHS molar ratio of the partially regenerated potassium reagent stream is at least 0.8:1. In another embodiment, at least 75 wt % of the total active potassium active reagents in the desulfurization reagent solution are in the form of potassium sulfide ($K_2S$). In a preferred embodiment, the water content of the regenerated potassium sulfide reagent stream is less than 5 wt %.

DETAILED DESCRIPTION OF THE INVENTION

Overview

In various embodiments, methods are provided for regeneration of potassium salts used as a reagent in desulfurization of heavy oil feeds. Using a potassium salt as a reagent can provide a number of advantages over conventional processes. Relative to thermal conversion processes, a potassium salt is desulfurization process provides for improved liquid product yields and corresponding reduction in production of coke. Relative to conventional hydroprocessing, potassium salt processes have a reduced hydrogen consumption. The potassium salt desulfurization processes can also operate at lower temperatures and/or pressures, allowing for reduced capital and/or operating costs.

Regeneration of potassium salt reagents can allow some or all of the above benefits to be achieved in a cost effective manner. Spent potassium salt reagent, typically in the form of a potassium hydrosulfide, can be regenerated to potassium hydroxide and/or potassium carbonate via an intermediate conversion to a potassium sulfide. The potassium carbonate can then be reacted with calcium oxide to form potassium hydroxide and calcium carbonate. Further cost savings can be achieved by regenerating the calcium oxide. Optionally, the carbon dioxide can also be recycled, by capturing carbon dioxide from the regeneration of calcium oxide and using this carbon dioxide for formation of potassium carbonate.

Specifically provided for herein is a process for regenerating the spent potassium reagents into primarily $K_2S$ species reagents for use in the hydrocarbon conversion reaction processes herein. As discussed further herein, the use of $K_2S$ as a reagent in the current processes is superior to KOH in many factors. As noted herein, commercial availability of $K_2S$ as a reagent is prohibitive. The current processes allow the use of KOH as the fresh reagent and provide a process for the conversion of the primarily KHS and KOH potassium salts in the "spent reagent" stream to be converted to primarily $K_2S$ for reuse in the hydrocarbon conversion reaction. The system can be replenished with "fresh" reagent in the form of readily to available KOH compounds.

Hydrocarbon Conversion & Desulfurization Utilizing Potassium Reagents

Various embodiments of the invention can be useful for desulfurization of "heavy oil feedstreams" or "heavy oil streams", which as used herein are equivalent. Heavy oil feedstreams or heavy oil streams are defined as any hydrocarbon-containing streams having an API gravity equal to or less than 19. Preferred heavy oil feedstreams for use in the present invention include, but are not limited to low API gravity, high sulfur, high viscosity crudes; tar sands bitumen; liquid hydrocarbon streams derived from tar sands bitumen, coal, or oil shale; as well as petrochemical refinery heavy intermediate fractions, such as atmospheric resids, vacuum resids, and other similar intermediate feedstreams and mixtures thereof containing boiling point materials above about 650° F. (343° C.). Heavy oil feedstreams as described herein may also include a blend of the hydrocarbons listed above with lighter hydrocarbon streams, such as, but not limited to, distillates, kerosene, or light naphtha diluents, and/or synthetic crudes, for control of certain properties desired for the transport or sale of the resulting hydrocarbon blend, such as, but not limited to, transport or sale as fuel oils and crude blends.

The sulfur content of the heavy oil feedstream can contain at least about 0.5 wt % sulfur, preferably at least about 1 wt % sulfur, and more preferably at least about 3 wt % sulfur. In other embodiments, the heavy oil feedstream can contain polycyclic sulfur heteroatom complexes which are difficult to desulfurize by conventional methods.

In various embodiments, a potassium salt can be used as a reagent in a desulfurization process. In order to use the potassium salt as a reagent, the potassium salt can be mixed into the heavy oil feedstream as an aqueous solution. The mixture of heavy oil and aqueous potassium salt solution can then be partially, substantially, or completely dehydrated to produce a heavy oil feedstream containing potassium salt particles.

Potassium hydroxide (KOH) is a readily available material that can be utilized as a reagent to such processes for heavy oil conversion. In the present invention, it has been discovered that potassium sulfide ($K_2S$) is a much more preferable reagent in such conversion reactions. Compared to KOH, the use of a $K_2S$ reagent provides more benefits than KOH in several processing measures. Firstly, the use of $K_2S$ results in lower undesired coke formation in the hydrocarbon reaction products as compared to KOH as a reagent. Secondly, $K_2S$ results in a higher desired desulfurization rate in the hydrocarbon reaction products as compared to KOH as a reagent.

Thirdly, the use of KOH as a reagent results in the significant formation of undesired carbonates in the hydroconversion system. These carbonates tend to drop out in the process as solids and are hard to manage removal in the conversion system. Additionally, these carbonates tend to coat onto surfaces of the hydroconversion equipment, resulting in the need for costly shutdown and cleaning/removal. These carbonates also tend to be corrosive to many of the typical materials utilized in the system. The use of $K_2S$ reduces the amount of overall carbonate formation during the hydrocarbon conversion process due to the elimination of oxygen (in the form of $OH^-$) from the reagents utilized in the system.

However, a significant problem with utilizing $K_2S$ as a reagent is that it simply is not commercially available at a reasonable cost. As such, the processes of the prior art utilize purchased KOH as a reagent into the conversion system and regenerate the spent potassium salts back into KOH for recycle into the front of the heavy oil conversion system. In the present invention is disclosed a process for maximizing the conversion of the spent potassium reagents into $K_2S$ (instead of to KOH) for recycling back into the heavy oil conversion system. It should be noted that while the systems herein primarily utilize KOH and $K_2S$ as reagents, that embodiments can include potassium reagent mixtures with other alkali metal salts added such as, but not limited to, NaOH or $Na_2S$.

Figure 1:
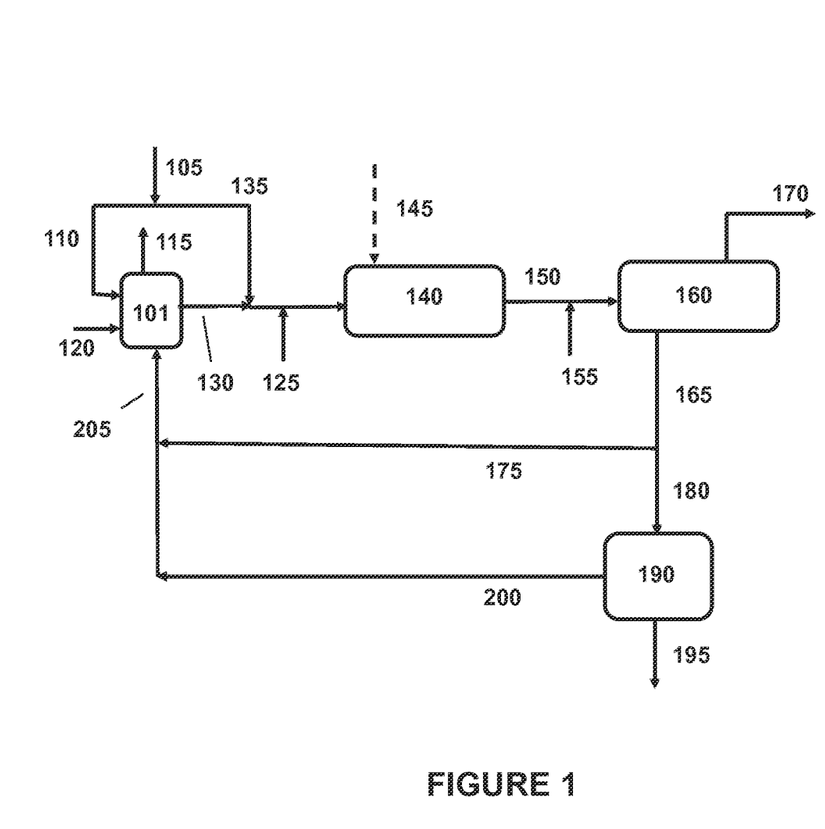
FIG. 1 is a simplified flow diagram of a preferred embodiment of the present invention.

This process can be illustrated by FIG. 1 which shows an embodiment of the over combined potassium salt/heavy oil conversion reaction system, the oil product/spent potassium reagent system, and the split regeneration system for converting the spent potassium reagents to substantially $K_2S$ reagent and reintroduction of this potassium reagent back into the heavy oil conversion reaction system. As will be described further in the $K_2S$ Regeneration System section herein, a mixture of KOH and KHS is substantially converted into a $K_2S$ reagent in the flash regeneration system 101 in FIG. 1. Preferably, a regeneration oil sidestream 110, is taken off the heavy oil feedstream 105, and supplied to the flash regeneration system 101. However, this regeneration oil sidestream 110 may be supplied in whole, or in part, from a source separate from the heavy oil feedstream 105. While it is not necessary to include a hydrocarbon oil stream in the regeneration process, the presence of oil will keep the potassium reagents in suspension/solution during the removal of the aqueous phase during the flash regeneration step thereby eliminating the need to handle the generated potassium reagents (primarily $K_2S$) as a solid in the overall system.

In the flash regeneration system 101, the aqueous mixture of KOH and KHS is heated at elevated temperatures to convert the KOH and KHS, which are preferably present in close to stoichiometric amounts in the flash regeneration system, to primarily $K_2S$ and water. Preferably, the water product from the reaction is removed from the system, primarily as water vapor, via stream 115. Additional fresh KOH may be added to the system as make-up either via a first KOH makeup stream 120 into the flash regeneration system 101, and/or can be added via a first KOH makeup stream 125 into the mixed heavy oil/reagent feed stream to the conversion reactor 140. In an embodiment, the KOH can be introduced into the heavy oil feed as an aqueous stream. Preferably, the aqueous KOH makeup stream can be a roughly saturated solution in water. The solubility of potassium salts in water is dependent on the type of salt. For example, KOH is soluble up to about 50 wt % KOH in an aqueous solution.

As shown in FIG. 1, a $K_2S$ reagent stream 130 is drawn from the flash regeneration system 101. This stream will primarily contain the regenerated $K_2S$ reagent and liquid heavy oil hydrocarbons with the majority of the KOH and KHS to the flash regeneration system 101 having been converted to $K_2S$ and the majority of water having been driven off in the reaction via water vapor stream 115. Preferably, at least 50 wt %, more preferably at least 75 wt %, and most preferably at least at least 90 wt % of the total active potassium reagents in the $K_2S$ reagent stream 130 (based on the total weight of the combined KOH and $K_2S$ in the stream) will be $K_2S$. Please note that in the processes herein only the potassium species KOH and $K_2S$ are considered as active potassium reagents, since the other significant potassium species, such as KHS and $K_2CO_3$, are not chemically active in the desulfurization reaction of the heavy oils and are conversely, inactive byproducts of the desulfurization reactions.

The remainder (and preferably the majority) of the heavy oil feedstock stream 105 is added to the reaction system via main heavy oil feedstream 135, mixing with the $K_2S$ reagent stream 130 prior to entering the conversion (or "desulfurization") reactor 140. Mixing of these streams can be facilitated using a static or dynamic mixer.

The conversion (or "desulfurization") reactor 140 can be comprised of a vessel or even simply piping which provides sufficient contact time and conditions for a desired level of desulfurization of the hydrocarbon portion of the overall process stream. A hydrogen-containing stream 145 may optionally be added to the potassium reagent desulfurization reaction. If a hydrogen-containing stream is utilized, it is preferred that the hydrogen-containing stream contain at least 50 mol % hydrogen, to more preferably at least 75 mol % hydrogen. When hydrogen is utilized in the process, it is preferred that the hydrogen partial pressure in the heavy oils desulfurization reactor be from about 100 to about 2500 psi (689 to 17,237 kPa). At these partial pressures, the hydrogen assists in the reaction process by removing at least a portion of the sulfur in the hydrocarbons via conversion to the potassium hydrosulfide. Excess hydrogen also assists in hydrogenating the broken sulfur bonds in the hydrocarbons and increasing the hydrogen saturation of the resulting desulfurized hydrocarbon compounds.

Preferably, two or more reactors can be used as desulfurization reactors. A separator can be included after each reactor to remove contaminants, such as $H_2S$ or water vapor that may form during the reaction. Another potential advantage of using two or more reactors is that the conditions in the reactors can be controlled separately. For example, the first of two reactors can be set at more severe conditions. Based on the design of the reactor, the holding time in the first reactor can correspond to a first period of time less than the desired reaction time. The partially reacted feed can then be passed to a second reactor zone at a less severe reaction condition, such as reactor at a lower temperature. By limiting the amount of time the heavy oil spends under more severe conditions, a desired level of desulfurization and/or conversion can be achieved, while reducing the amount of undesired coke production.

Suitable desulfurization conditions in a heavy oils conversion reactor 140 can include temperatures from about 600° F. to about 900° F. (316° C. to 482° C.), preferably about 650° F. to about 875° F. (343° C. to 468° C.), and more preferably about 700° F. to about 850° F. (371° C. to 454° C.). Suitable reaction pressures can be from about 50 to about 3000 psi (345 to 20,684 kPa), preferably about 200 to about 2200 psi (1,379 to 15,168 kPa), and more preferably about 500 to about 1500 psi (3,447 to 10,342 kPa). In a preferred embodiment, the contact time of the mixed heavy oil/reagent feed stream in the heavy oils conversion reactor can be about 5 to about 720 minutes, preferably about 30 to about 480 minutes, and more preferably 60 to to about 240 minutes. It is noted that a suitable contact time can be dependent upon the physical and chemical characteristics of the hydrocarbon stream including the sulfur content and sulfur species of the hydrocarbon stream, the amount of sulfur to be removed, and the molar ratio of the potassium reagent used in the process to the sulfur present in the heavy oils feedstream.

In an embodiment, the desulfurized product can have an API of at least about 20, or at least about 21, or at least about 23. The viscosity can be about 40 cst or less at 40° C. Alternatively, the viscosity can be about 350 cst or less at a temperature of about 7.5 to 18.5° C. Preferably, the sulfur content by wt % of the desulfurized product is less than 50%, more preferably less than 25%, of the sulfur content by wt % of the heavy oils feedstream. That is, the desulfurization reaction removes at least about 50 wt % of the sulfur from the heavy oils feedstream to produce a significantly lower sulfur content desulfurized heavy oils product stream.

The amount of potassium reagent mixed with the heavy oil feed can be selected based on the sulfur content of the feed. In an embodiment, the amount of active potassium reagents (i.e., combined KOH and $K_2S$), on a moles of potassium metal versus moles of sulfur basis, can be at least about 1.2 times the amount of sulfur in the heavy oil feed, or at least about 1.4 times, or at least about 1.5 times. Alternatively, the amount of active potassium reagents (i.e., KOH and $K_2S$), on a moles of potassium metal versus moles of sulfur basis, can be about 2.5 times the amount of sulfur or less, or about 2 times or less, or about 1.75 times or less, the amount of sulfur in the heavy oil feed. In another embodiment, the weight of the active potassium reagent particles in the hydrocarbon heavy oil feed can be at least about 2 wt %, or at least about 3 wt %, or at least about 7.5 wt %, or at least about 10 wt %, or at least about 15 wt %. Alternatively, the weight of active potassium reagent particles can be about 20 wt % or less, or about 15 wt % or less, or about 10 wt % or less.

Separation of Spent Potassium Reagents from the Desulfurized Oil

Continuing with the process as exemplified in FIG. 1, after forming a desulfurized heavy oil product 150, the spent potassium reagents can be separated from the desulfurized oil. When $K_2S$ is used as a reagent spent reagent species will be primarily KHS (the sulfur being removed from the heavy oil), as well as significantly lower amounts of $K_2S$, KOH, and potassium carbonates. These species can be removed from the desulfurized hydrocarbon conversion products via a water wash. A wash water stream 155 is mixed with the desulfurized heavy oil product stream 150 and sent to a wash water vessel 160 (or alternatively, a series of wash water vessels). If $K_2S$ is present in the desulfurized oil, the $K_2S$ can convert into KOH and KHS when exposed to water from the water wash. Preferably, the separation process can remove approximately 99.9% of the potassium from the desulfurized product. In such an embodiment where a desulfurization conversion reaction is performed with a reagent treat rate of 15 wt %, this would result in a desulfurized product containing about 150 ppm potassium or less.

In an embodiment (continuing with FIG. 1), the spent potassium reagent species are separated from the desulfurized heavy oil product 170 as an aqueous spent potassium reagent stream 165 (or "streams" if a multi-stage wash water process is utilized). For such a separation, the reactor product and spent potassium reagents mixture can be mixed with the wash water through mixing valves. As an example, there may be just a single wash water vessel, or conversely, two or more wash water vessels can be used in series to achieve separation of the spent potassium reagents and the desulfurized oil. In (or optionally prior to entry into) the wash water vessels, a wash water and the desulfurized of are introduced and mixed. The mixture flows through the wash water vessel and reduced velocities and at least one separate oil and one separate water layer is formed. An optional desalting vessel can also be utilized in conjunction with the wash water vessels. The desalting vessel includes an electrostatic precipitator so that electrostatic coalescence can be used to assist the separations process and provide for removal of high the spent reagents to very low levels from the desulfurized heavy oil product 170. Preferably, a desalting stage can be used as a final wash stage.

The wash water can be distributed between the separation stages in any convenient manner. In an embodiment, the flow of water can be globally counter-current, so that fresh wash water is used in the final wash stage. The water product from each wash stage is then successively used in each earlier stage until the first stage is reached. The amount of wash water used for separation can be at least about 5 vol % of the total volume of the desulfurized oil, or at least about 10 vol %, or at least about 15 vol %. Alternatively, the amount of wash water can be about 60 vol % or less, or about 50 vol % or less, or about 40 vol % or less, or about 30 vol % or less.

The oil and water mixture in a settling vessel will separate into an aqueous phase and a desulfurized oil phase. These phases can be present in each stage of a multi-stage separator. The desulfurized oil phase can still include small amounts of spent potassium salts, other solids, and some water. Part of the reason for using multiple stages can be to successively reduce the levels of these impurities in each of the phases. The other phase in the settling vessel is an aqueous phase that includes the majority of the spent potassium reagents as a solution. Although the spent reagent can be a particle in the desulfurized oil prior to separation, the spent reagents are typically soluble in water. The aqueous phase will have a higher density than the desulfurized oil phase and will tend to be drawn off from the bottom of the settling vessel. Other solids in the mixture, such as asphaltenes, coke and metals will tend to settle into the aqueous phase or at the bottom of the settling vessel where these solid materials can be drawn off with the aqueous phase materials and/or be separately collected and removed from the settling vessel. A filter or other suitable means can also be used to capture any to solids that exit the separator with the aqueous phase stream.

The concentration of spent potassium reagents in the aqueous phase produced by the one or more stages of a water wash separator can be at least about 15 wt %, or at least about 25 wt %. The concentration can be about 40 wt % or less, or about 35 wt % or less. Higher concentrations are preferable, as this can reduce the amount of water removal needed to provide a concentrated spent reagent solution.

The reaction conditions for separating the potassium reagent species from the desulfurized oil can be temperatures and pressures that are convenient for the other stages of the regeneration process. The separation conditions can include a temperature of at least about 120° C. (248° F.), or at least about 135° C. (275° F.), or at least about 150° C. (302° F.). The separation pressure can be at least about 100 psig (690 kPa), or at least about 200 psig (1379 kPa), or at least about 300 psig (2068 kPa), or at least about 350 psig (2413 kPa).

Splitting of the Aqueous Spent Potassium Reagents Stream

As noted prior, the present invention contains a novel process for converting the spent potassium reagents primarily into $K_2S$ species for reintroduction into the hydrocarbon conversion/desulfurization reaction processes. A key step in this process is splitting the resulting aqueous spent potassium reagent stream 165 into at least two separate streams. It should be noted that when the term "aqueous spent potassium reagent stream" is utilized, it can be construed as any one of the aqueous spent potassium reagent streams (as in the case where multiple wash water separators are utilized) or any combination of these streams. Preferably, if there are spent potassium reagent streams, the majority of the streams are combined and then separated as described herein for further processing. By the term "majority of the streams", it is meant that the combined streams subjected to this further splitting and processing contain at least 50 wt %, and more preferably at least 75 wt % of the overall to spent potassium reagents obtained from the conversion reactor and subsequent wash water processes.

After removing the aqueous spent potassium reagent stream 165 from the wash water section, the stream is separated into at least one non-regenerative KHS stream 175 (also referred to herein for simplicity as "KHS Stream 1") and at least one regenerative KHS stream 180 (also referred to herein for simplicity as "KHS Stream 2"). The first of these streams will not require conversion of the KHS species prior to the $K_2S$ conversion step in the flash regeneration system 101 described further herein, while the latter stream will require the KHS in the stream to be substantially converted to KOH prior to the $K_2S$ conversion step in the flash regeneration system 101, as described further herein.

It is desired that the streams be split so that KHS Stream 2 will result in about the same total molar concentration of KOH after the KOH conversion process 190. That is the intent is to have approximately a 1:1 molar ratio of KOH and KHS in the recombined aqueous reagent stream 205 that is subjected to the $K_2S$ conversion step 101 described further herein. Preferably, the ratio of moles of KHS in KHS Stream 1 (175) to moles of KOH in the recombined aqueous reagent stream (205) is from about 0.7:1 to about 1:0.7, more preferably about 0.8:1 to about 1:0.8, and most preferably about 0.9:1 to about 1:0.9.

Since some concentration of carbonates will be converted to KOH in the KOH conversion process 190 and given other possible conversion rates and inefficiencies in the systems, this initial split may preferably range from about KHS molar content in KHS Stream 1:KHS molar content in KHS Stream 2 from about 0.7:1 to about 1:0.7, more preferably about 0.85:1 to about 1:0.85.

Additionally, in the $K_2S$ conversion step in the flash regeneration system 101, it is desired that the KOH to KHS ratio is preferably at least 0.8:1, more preferably at least 0.9:1, even more preferably at least 1.0:1, or even at least 1.1:1, as a small excess of KOH in the reaction products of this step will not be significantly detrimental for use as in potassium reagents to the heavy oil conversion reactor 140.

KOH Conversion Process

The KHS Stream 2 may undergo any process for converting the KHS species to KOH. A preferred method for achieving this conversion is described herein.

In the first part of the KOH conversion process 190, KHS Stream 2 is subjected to a process for converting the KHS into a carbonate as an intermediate product in the process of converting the spent reagent to KOH. This involves converting KHS in the KHS Stream 2 into $K_2CO_3$.

KHS can be converted into $K_2CO_3$ by bubbling $CO_2$ gas through the aqueous spent alkali metal solution. The displaced sulfur can ultimately form $H_2S$, which can be sent to a Claus plant. Optionally, an amine plant can be used to remove excess $CO_2$ from the $H_2S$ product. This process can lead to production of both $K_2CO_3$ and $KHCO_3$. Depending on the conditions, the amount of $KHCO_3$ production can be substantial, such as up to about 30% or higher. Any $KHCO_3$ that is formed can be converted after the carbonation reaction to $K_2CO_3$, $CO_2$, and water by heating the aqueous solution, such as by exposing the solution to steam stripping conditions at about 150° C. (302° F.) or more, or at about 175° C. (347° F.) or more. More generally, it is believed that $KHCO_3$ is less stable at temperatures above 110° C. (230° F.), so other methods involving heating the $KHCO_3$ can be suitable for conversion to $K_2CO_3$. In another embodiment, boiling of the aqueous solution containing the $KHCO_3$ may be sufficient for conversion to $K_2CO_3$. Conversion of any $KHCO_3$ to $K_2CO_3$ can be beneficial in that the additional $CO_2$ released by conversion to $K_2CO_3$ may be recycled back to the carbonation step, thereby reducing the overall $CO_2$ use requirement.

The $CO_2$ can be contacted with the spent potassium reagents in any convenient manner. For example, one or more counter-current flow stages can be set up for passing $CO_2$ gas through the aqueous potassium salt solution. Multiple stages can be used to improve the conversion efficiency, such as using three consecutive counter-current stages.

The reaction conditions for contacting the aqueous potassium salt solution with $CO_2$ can include a temperature of at least about 120° C. (248° F.), or at least about 135° C. (275° F.), or at least about 150° C. (302° F.). The reaction pressure can be at least about 200 psig (1379 kPa), or at least about 250 psig (1724 kPa), or at least about 300 psig (2068 kPa), or at least about 350 psig (2413 kPa).

After forming potassium carbonate, $K_2CO_3$, the carbonate is converted into potassium hydroxide via reaction with CaO. The potassium carbonate can be contacted with the CaO in any convenient manner. One suitable method is to contact an aqueous potassium carbonate solution with the CaO in a stirred tank reactor. The CaO may be added as a solid or as an aqueous slurry. It may be preferable to generate the aqueous CaO slurry under conditions suitable to convert at least a portion of the aqueous slurry from CaO to $Ca(OH)_2$. The carbonate solution can be held in the reactor for a sufficient amount of time to achieve a desired level of conversion. A suitable holding time can be at least one minute, or at least 5 minutes, or at least 10 minutes. A desired level of conversion in each reactor can be at least 50%, or at least 75%, or at least 90%, or at least 95%. By using multiple reactors that each achieve a desired level of conversion, a higher total level of conversion can be achieved, such as at least 99% conversion, or at least 99.9% conversion. Note that any bicarbonate species present, such as $KHCO_3$, will also be converted to alkali hydroxide. However, this reaction is not preferred, as additional Ca is consumed by this process. Thus, it is preferred to drive the potassium carbonate reaction in the prior stage substantially to completion, such as by supplementing the formation of potassium carbonate by heating the carbonate containing solution, as described above.

During contacting of the potassium carbonate with CaO, the solution can also be seeded with seed particles of $CaCO_3$. The reaction of potassium carbonate with CaO produces potassium hydroxide which is soluble in water. The reaction typically also produces $CaCO_3$, which is insoluble and forms particles. Depending on the reaction conditions, the particle size of the $CaCO_3$ particles can vary. The size of the $CaCO_3$ particles formed under a given reaction condition can be increased by introducing seed particles of $CaCO_3$.

The $CaCO_3$ particles can be removed from the aqueous solution to form an aqueous regenerated KOH stream 200 (see FIG. 1). The $CaCO_3$ particles can be removed from the aqueous solution by any convenient method. One option for removing the particles is by filtration. Increasing the size of the $CaCO_3$ particles can assist in allowing the particles to be removed by filtration. Increasing the size of the $CaCO_3$ particles can also assist with density based separation process, such as settling or centrifugal techniques.

After separating the dissolved potassium hydroxide from the calcium solids, the potassium hydroxide solution can be partially dehydrated to further concentrate, prior to introducing the aqueous regenerated KOH stream 200 to the next step. For example, the potassium hydroxide solution can be heated to remove water content, leading to a solution with a concentration of KOH of at least about 30 wt %, or at least about 40 wt %, or at least about 50 wt %.

The reaction conditions for contacting the potassium carbonate with CaO can include a temperature of at least about 135° C. (275° F.), or at least about 150° C. (302° F.), or at least about 160° C. (320° F.). The reaction pressure can be at least about 200 psig (1379 kPa), or at least about 250 psig (1724 kPa), or at least about 300 psig (2068 kPa), or at least about 350 psig (2413 kPa).

In order to complete the KOH regeneration cycle, the $CaCO_3$ can be regenerated to form CaO for use in further regeneration of the alkali metal reagent. $CaCO_3$ can be converted to $CaO+CO_2$ if exposed to sufficiently high temperatures. One example of a method for regenerating CaO is to pass the $CaCO_3$ particles through a kiln operating at a temperature of at least about 900° C. (1652° F.), or at least about 1000° C. (1832° F.). After regeneration, the CaO can be used again for regenerating alkali metal reagent.

Prior to regeneration, the $CaCO_3$ can be passed through a water wash stage to remove any excess potassium species. A vacuum filtration can then be used to remove the water and dissolved alkali metal prior to sending the $CaCO_3$ to a kiln or other heating step for CaO formation. Excess alkali metal present in the $CaCO_3$ can lead to additional $CO_2$ remaining in the CaO product. While this is not detrimental to the other processes, it can lead to unwanted consumption of potassium reagent species.

$K_2S$ Conversion Step

As described in part above, the aqueous regenerated KOH stream 200 (a.k.a. "KHS Stream 2") generated is combined with the non-regenerated KHS stream 175 (a.k.a. "KHS Stream 1") that was prior separated from the aqueous spent potassium reagent stream 165 in the prior steps above. This combined partially regenerated potassium reagent stream 205 is then sent to a $K_2S$ conversion step via the flash regeneration system 101, described at the beginning of the overall heavy oil conversion reaction process.

As noted prior, it is desired that the stoichiometric ratio of KOH to KHS in the partially regenerated potassium reagent stream 205 be about 1:1. However, in preferred embodiments, the KOH to KHS ratio is preferably at least 0.8:1, more preferably at least 0, 9:1, even more preferably at least 1.0:1, or even at least 1.1:1, as a small excess of KOH in the reaction products of this step will not be significantly detrimental for use as in potassium reagents to the heavy oil conversion reactor 140. In preferred embodiments, at least 50 wt %, more preferably at least 75 wt %, and most preferably at least at least 90 wt % of the total active potassium salt reagents in the resulting $K_2S$ reagent stream 130 (based on the total combined weight of KOH and $K_2S$ in the stream) will be in the form of $K_2S$.

As noted prior, in the $K_2S$ conversion step, it is desired that at least a portion of the heavy oil to be treated, or alternatively a separate oil or solvent source, be added to the flash regeneration system 101 in order to avoid handling of the $K_2S$ and other potassium reagents produced in this step in solids form as the presence of oil will keep the potassium salt reagents in suspension/solution during the removal of the aqueous phase during the flash regeneration step thereby eliminating the need to handle the generated potassium reagents (primarily $K_2S$) as a solid in the overall system.

In the flash regeneration system 101, the aqueous mixture of KOH and KHS, and preferably oil, is heated at elevated temperatures to convert the KOH and KHS, which are preferably present in close to stoichiometric amounts in the flash regeneration system, to primarily $K_2S$ and water. This will drive the following reaction:

Preferably, the water product from the reaction is removed from the system, primarily as water vapor, via stream 115. As shown in Example 2 herein, temperatures of about 425° C. were sufficient to convert the KOH/KHS solution to essentially anhydrous $K_2S$ with only a very low amount of nitrogen stripping gas which was used essentially to drive the generated water vapor through the system. Estimates show that at $K_2S$ conversion system temperatures below about 330 to 400° C. (626 to 752° F.) while operated at atmospheric pressure, water contents of less than 5 wt % water in the $K_2S$ reagent stream 130 can be achieved which is sufficient for the overall the heavy oil conversion process in reactor 140. These temperatures, particularly those below about 375° C. (707° F.), are also sufficiently low to prevent any substantial thermal cracking of the heavy oils present in the flash regeneration system 101.

Alternatively, as is illustrated in Example 2, a nitrogen gas can be used in the flash regeneration system 101 in significant enough amounts to effectively lower the partial pressure of water vapor in the flash regeneration system 101 resulting in a lower temperature at which the essentially anhydrous $K_2S$ product can be formed. Here, with nitrogen stripping gas, the essentially anhydrous $K_2S$ product was formed at a temperature of about 380° C. (716° F.). While such lower temperatures are not demanded by the system, the use of nitrogen as a stripping stream can be utilized to lower the overall required heat input into the flash regeneration system 101, as well as further reduce the possibility of unwanted hydrocarbon reactions in the $K_2S$ regeneration system.

It should be noted that other gases, such as hydrogen, may alternatively or additional be used as a stripping stream in the flash regeneration system. These stripping streams, while significantly reducing the overall required $K_2S$ regeneration temperature in this stage of the process, are removed with the water vapor stream, easily separated from the water vapor through a partial condensation process, and can be recycled to the flash regeneration system for reuse. Preferably, the dehydration temperature of the flash regeneration system 101 is at least about 250° C. (482° F.), or at least about 300° C. (572° F.), or at least about 325° C. (617° F.), or at least about 350° C. (662° F.). In other embodiments, the dehydration temperature of the flash regeneration system 101 is below about 375° C. (707° F.).

Figure 2:
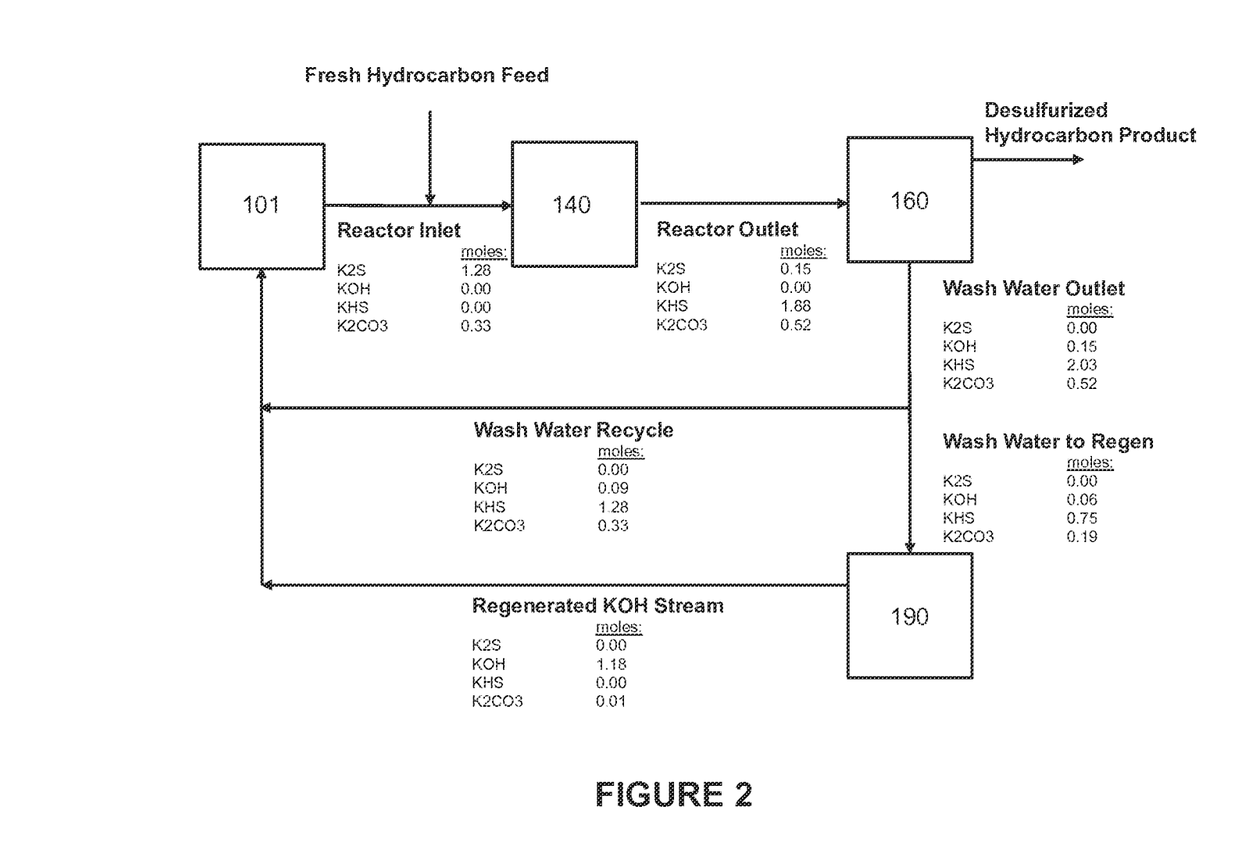
FIG. 2 is a simplified flow diagram with material balances of an embodiment of the present invention as described in Example 1.

Example 1, and its associated FIG. 2, shows a simplified flow diagram of an embodiment of the process of invention with material balances for the reagents in the reaction and regenerations cycles. This simulation shows that both a high level of desulfurization of the heavy oil can be maintained while the majority of the spent reactants (primarily KHS) can be converted back in-situ into the more highly beneficial $K_2S$ reagent form.

Figure 3:
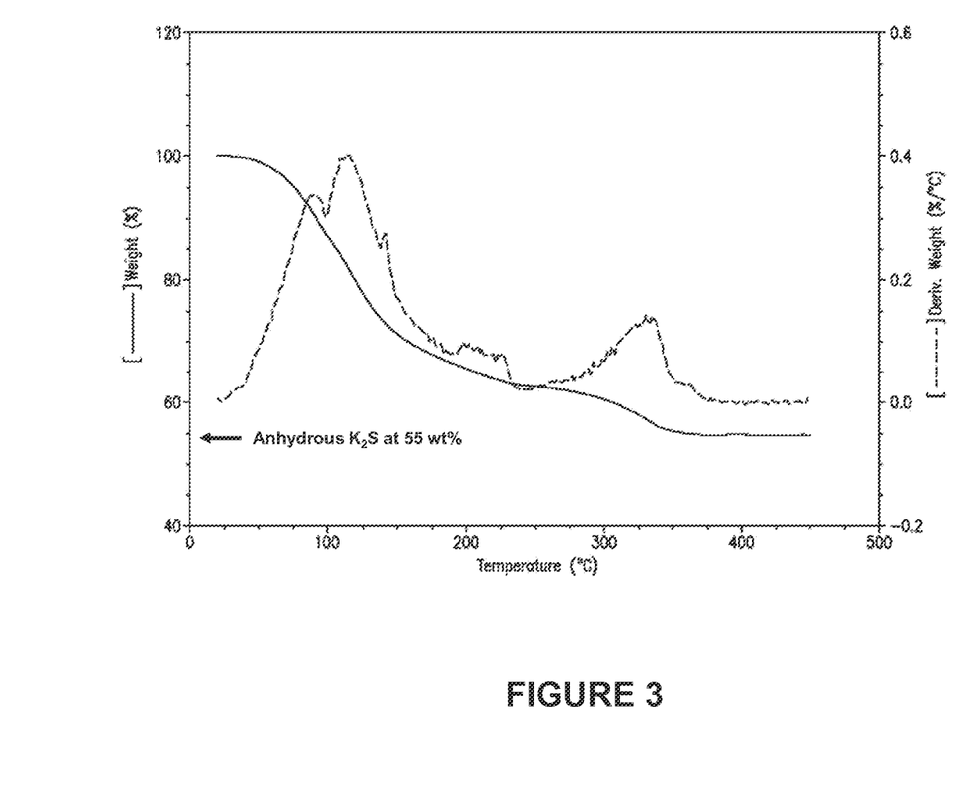
FIG. 3 is Thermogravimetric Analysis (TGA) of Sample 1 of Example 2 showing the conversion of $K_2S$ from an aqueous KHS/KOH sample under a nitrogen stripping stream.
Figure 4:
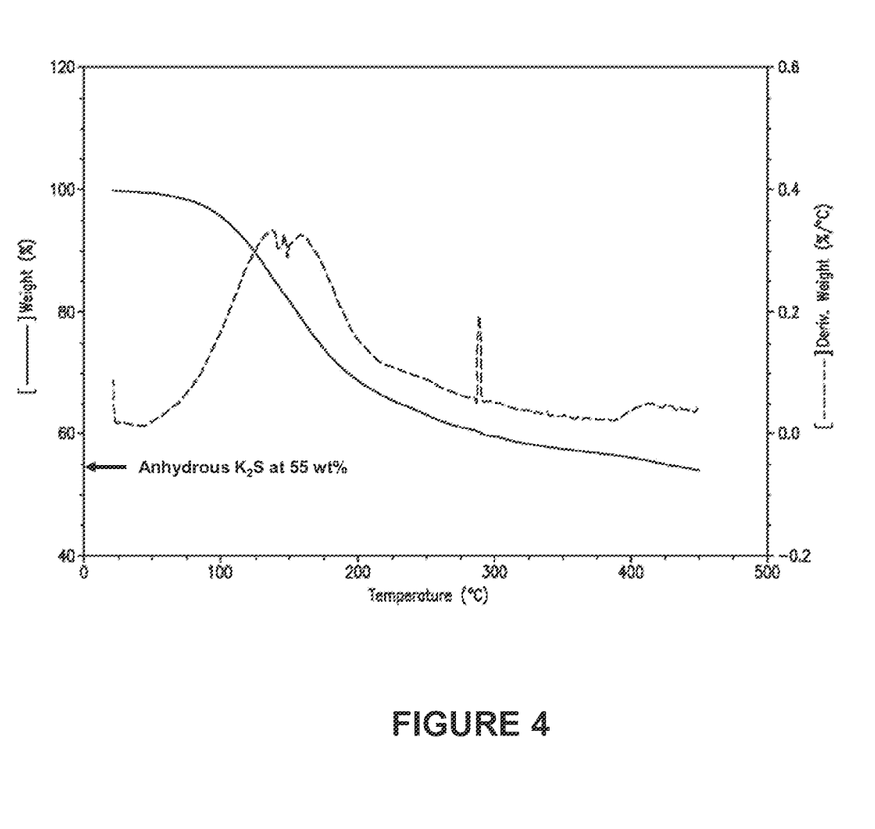
FIG. 4 is Thermogravimetric Analysis (TGA) of Sample 2 of Example 2 showing the conversion of $K_2S$ from an aqueous KHS/KOH sample in the substantial absence of a nitrogen stripping stream.
Figure 5:
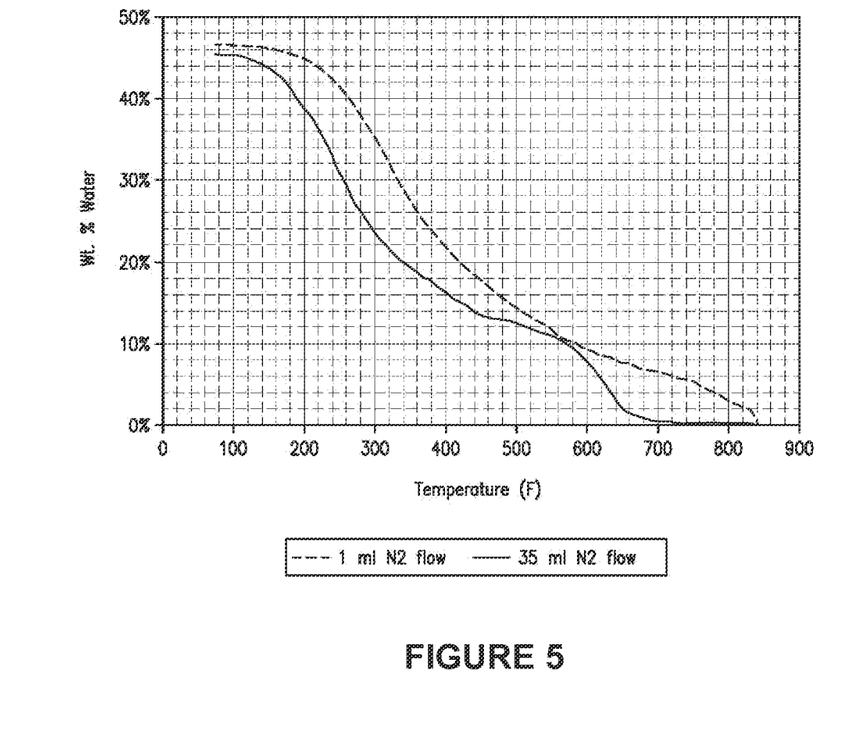
FIG. 5 is a composite of the Thermogravimetric Analyses (TGA) of Samples 1 and 2 showing that conversion to $K_2S$ reagent product with less than 5 wt % water content can be achieved at temperatures below about 330 to 400° C. (626 to 752° F.).

Example 2, and its associated FIGS. 3, 4 and 5, shows that a high extent of $K_2S$ conversion can be achieved utilizing the processes herein for converting the KHS/KOH spent potassium species to $K_2S$ with or without the use of a stripping gas. This example also shows that conversion that the $K_2S$ conversion reaction can be driven to less than about 5 wt % water can be achieved under either of these conditions at less than about 330 to 400° C. (626 to 752° F.) (see FIG. 5). This amount of water can be tolerated in the latter conversion reactor processes and is low enough to prevent substantial cracking of the hydrocarbon diluent in the K$_2$S conversion process required to keep the potassium reagents dissolved/suspended in a liquid medium.

Although the present invention has been described in terms of specific embodiments, it is not so limited. Suitable alterations and modifications for operation under specific conditions will be apparent to those skilled in the art. The examples provided herein are merely illustrative of the functionality and/or benefits of the invention herein and are not meant to be limiting embodiments of the invention in any manner. It is also intended that the claims herein be interpreted as covering all such alterations and modifications as fall within the true spirit and scope of the invention.

EXAMPLES

Example 1

This example illustrates a simulation of an embodiment of the invention disclosed and described herein. FIG. 2 herein illustrates the simplified process flow arrangement and the potassium species reagent and reactant molar compositions in each stream from the model. The major process elements numbered 101, 140, 160 and 190 in FIG. 2 are essentially the same as these corresponding elements with same element numbers as described for and as shown in FIG. 1.

Here, the combined desulfurization and K$_2$S regeneration process as described was modeled utilizing a heavy hydrocarbon feedstream with a sulfur content of 1 mole and contacting with a regenerated potassium reagent stream from the flash regeneration system 101 as shown containing 1.275 moles of potassium sulfide (K$_2$S) in the conversion reactor 140. The desulfurization reaction was modeled to obtain 75 wt % of the sulfur removal from the hydrocarbon feedstream in the conversion reactor. The makeup of the spent reagents in the reactor outlet stream is shown in FIG. 2. The spent reagents are comprised significantly of potassium hydrosulfide, KHS, with small amounts of potassium carbonate, K$_2$CO$_3$, and unreacted potassium sulfide, K$_2$S.

As can be seen in FIG. 2, the reactor outlet stream is subjected to a wash water step 160 to remove the spent potassium reagents and per the invention, the aqueous spent potassium reagent stream (containing primarily KHS spent reagent) is separated into two streams (labeled in FIG. 2 as "KHS Stream 1" and "KHS Stream 2"). KHS Stream 2 is sent to the KOH regeneration process 190. As can be seen from FIG. 2, KHS Streams 1 and 2 are separated so that the KOH content in KHS Stream 2, after regeneration, is close to the content of KHS in KHS Stream 1. The carbonate conversion process was modeled at 99% carbonate conversion to KOH. As noted, some carbonates will remain in resulting recombination of the streams, primarily from the untreated KHS Stream 1 source.

The two streams (i.e., the KHS Stream 1 and the regenerated KOH stream) are then combined and subjected to elevated temperatures in the flash regeneration system thereby converting the KOH and KHS species in the streams to primarily K$_2$S and water. The water is removed and the newly regenerated K$_2$S reagent is reintroduced into the heavy hydrocarbon conversion reactor.

Example 2

This example, illustrates that essentially anhydrous K$_2$S can be formed from an aqueous KOH/KHS mixture according to the invention.

Two (2) samples were prepared from reagent grade chemicals with the composition of:

KOH+KHS+4H$_2$O

A thermal conversion was performed on each of the two (2) samples as follows.

K$_2$S Conversion of Sample 1

The first sample of the aqueous KOH/KHS mixture was placed in an aluminum pan and analyzed by the Thermogravimetric Analysis (TGA) under a conversion process which consisted of ramping the temperature of the sample at 10° C./min up to a final temperature of 450° C. under a nitrogen gas flow of 35 ml/mm. This simulated the K$_2$S reagent conversion process in the presence of a nitrogen stripping gas. The results of the resulting TGA analysis are shown in FIG. 3.

As can be seen from the data in FIG. 3, the sample was converted to essentially anhydrous K$_2$S (sample is essentially anhydrous K$_2$S at 55 wt %) at a temperature of about 380° C. (716° F.).

K$_2$S Conversion of Sample 2

The second sample of the aqueous KOH/KHS mixture was placed in an aluminum pan and analyzed by the Thermogravimetric Analysis (TGA) under a conversion process which consisted of ramping the temperature of the sample at 10° C./min up to a final temperature of 450° C. under a nitrogen gas flow of only 1 ml/min. This simulated the K$_2$S reagent conversion process essentially in the absence of a stripping gas. The results of the resulting TGA analysis are shown in FIG. 4.

As can be seen from the data in FIG. 4, the sample was converted to essentially anhydrous K$_2$S (sample is essentially anhydrous K$_2$S at 55 wt %) at a temperature of about 425° C. (797° F.).

The testing of these two samples under these conditions show that essentially anhydrous K$_2$S can be recovered from the thermal treatment of aqueous KOH/KHS solution (near stoichiometric). The examples also show that a stripping gas (such as nitrogen) can significantly lower the reaction temperature required. The examples also show that essentially anhydrous K$_2$S can be can be recovered from the reaction at slightly higher temperatures (i.e., about 425° C.).

Analysis of the data also shows that the K$_2$S conversion reaction can be driven to less than about 5 wt % water can be achieved under either of these conditions at less than about 330 to 400° C. (626 to 752° F.) (see FIG. 5). This amount of water can be tolerated in the latter conversion reactor processes and is low enough to prevent substantial cracking of the hydrocarbon diluent in the K$_2$S conversion process required to keep the potassium reagents dissolved/suspended in a liquid medium.

What is claimed is:

1. A process for desulfurizing a heavy oil feedstream with a potassium sulfide reagent and regenerating the potassium sulfide reagent from spent potassium salt reaction products, comprising:
   a) mixing at least a portion of a heavy oil feedstream having an API gravity of about 19 or less with a desulfurization reagent solution comprising potassium sulfide to form a mixed oil/reagent feedstream;
   b) exposing at least a portion of the mixed oil/reagent feedstream to effective desulfurization conditions in a conversion reactor to form a desulfurized reactor outlet stream, thereby removing at least a portion of the sulfur from the heavy oil feedstream components of the mixed oil/reagent stream and converting at least a portion of the potassium sulfide in the mixed reagent stream to spent potassium salts comprising potassium hydrosulfide;

c) adding a wash water to the desulfurized reactor outlet stream to form a desulfurized oil/water mixture;

d) separating the desulfurized oil/water mixture into a separate oil phase and a separate water phase in at least one wash water vessel, wherein the water phase contains the majority of the spent potassium salts;

e) extracting at least a portion of the separate oil phase from the wash water vessel as a desulfurized heavy oil product, and extracting at least a portion of the separate water phase from the wash water vessel as an aqueous spent potassium reagent stream;

f) splitting the aqueous spent potassium reagent stream into a non-regenerative potassium hydrosulfide stream and a regenerative potassium hydrosulfide stream;

g) sending the regenerative potassium hydrosulfide stream to a KOH conversion process, converting the majority of the potassium hydrosulfide to potassium hydroxide in the KOH conversion process, and producing an aqueous regenerated KOH stream from the KOH conversion process;

h) combining at least a portion of the aqueous regenerated KOH stream with at least a portion of the non-regenerative potassium hydrosulfide stream to produce a partially regenerated potassium reagent stream containing potassium hydroxide and potassium hydrosulfide;

i) sending the partially regenerated potassium reagent stream to a flash regeneration system wherein the partially regenerated potassium reagent stream is subject to a dehydration temperature of at least about 250° C. (482° F.), thereby converting at least a portion of the potassium hydroxide and potassium hydrosulfide in the partially regenerated potassium reagent stream to potassium sulfide;

j) extracting a regenerated potassium sulfide reagent stream from the flash regeneration system;

k) utilizing at least a portion of the regenerated potassium sulfide reagent stream in the desulfurization reagent solution of step a).

2. The process of claim 1, wherein the aqueous spent potassium reagent stream contains at least 50 wt % of all of the spent potassium salts generated in step b).

3. The process of claim 2, wherein the non-regenerative potassium hydrosulfide stream and the regenerative potassium hydrosulfide stream are split in step f) such that the KHS molar content in non-regenerative potassium hydrosulfide stream:KHS molar content in the regenerative potassium hydrosulfide stream is from about 0.7:1 to about 1:0.7.

4. The process of claim 2, wherein the non-regenerative potassium hydrosulfide stream and the regenerative potassium hydrosulfide stream are split in step f) such that the KHS molar content in non-regenerative potassium hydrosulfide stream:molar content of the aqueous regenerated KOH stream is from about 0.8:1 to about 1:0.8.

5. The process of claim 2, wherein the KOH to KHS molar ratio of the partially regenerated potassium reagent stream is at least 0.8:1.

6. The process of claim 4, wherein at least 75 wt % of the total active potassium reagents in the desulfurization reagent solution are in the form of potassium sulfide ($K_2S$).

7. The process of claim 6, wherein an external supply of fresh potassium hydroxide is added to the mixed oil/reagent feedstream.

8. The process of claim 6, wherein a regeneration oil sidestream is added to the partially regenerated potassium reagent stream either prior to or in the flash regeneration system.

9. The process of claim 8, wherein at least a portion of the regeneration oil sidestream is taken from the same supply source as the heavy oil feedstream.

10. The process of claim 8, wherein water content of the regenerated potassium sulfide reagent stream is less than 5 wt %.

11. The process of claim 10, wherein the amount of active potassium reagents, on a moles of potassium metal basis, in the desulfurization reagent solution is at least about 1.2 times the moles of sulfur in the heavy oil feedstream.

12. The process of claim 10, wherein the KOH conversion process comprises:

treating at least a portion of the regenerative potassium hydrosulfide stream with carbon dioxide under effective conditions to form an aqueous potassium carbonate stream;

mixing the aqueous potassium carbonate stream with a regenerated calcium oxide under effective conditions to form a mixture of aqueous potassium hydroxide and calcium carbonate solids;

separating the calcium carbonate solids from the aqueous potassium hydroxide to produce the aqueous regenerated KOH stream; and heating the calcium carbonate under effective conditions to form calcium oxide, wherein at least a portion of this calcium oxide produced is used in said regenerated calcium oxide for said mixing with the aqueous potassium carbonate.

13. The process of claim 12, wherein the effective conditions for treating the aqueous potassium carbonate stream with the regenerated calcium oxide comprise a temperature of at least about 135° C. (275° F.) and a pressure of at least about 200 psig (1379 kPa).

14. The process of claim 13, wherein heating the calcium carbonate under effective conditions comprises heating the calcium carbonate to at least about 900° C. (1652° F.).

15. The process of claim 10, wherein the heavy oil feedstream comprises boiling point materials above about 650° F. (343° C.) and further contains at least about 0.5 wt % sulfur.

16. The process of claim 15, wherein the desulfurized heavy oil product has an API of at least about 23.

17. The process of claim 10, wherein the effective desulfurization conditions in the conversion reactor include a reaction temperature from about 600° F. to about 900° F. (316° C. to 482° C.) and a reaction pressure from about 50 to about 3000 psi (345 to 20,684 kPa).

18. The process of claim 17, wherein a hydrogen-containing stream is added to the conversion reactor.

19. The process of claim 18, wherein the hydrogen-containing stream contains at least 50 mol % hydrogen and the hydrogen partial pressure in the conversion reactor is from about 100 to about 2500 psi (689 to 17,237 kPa).

20. The process of claim 18, wherein the sulfur content by wt % of the desulfurized heavy oil product is less than 50% of the sulfur content by wt % of the heavy oil feedstream.

21. The process of claim 18, wherein operating conditions within the wash water vessel include a temperature of at least about 120° C. (248° F.) and a pressure of at least about 100 psig. (690 kPa).

* * * * *